Oct. 29, 1935.  J. I. KIBBE  2,018,727
INTERNAL COMBUSTION ENGINE
Filed June 18, 1934
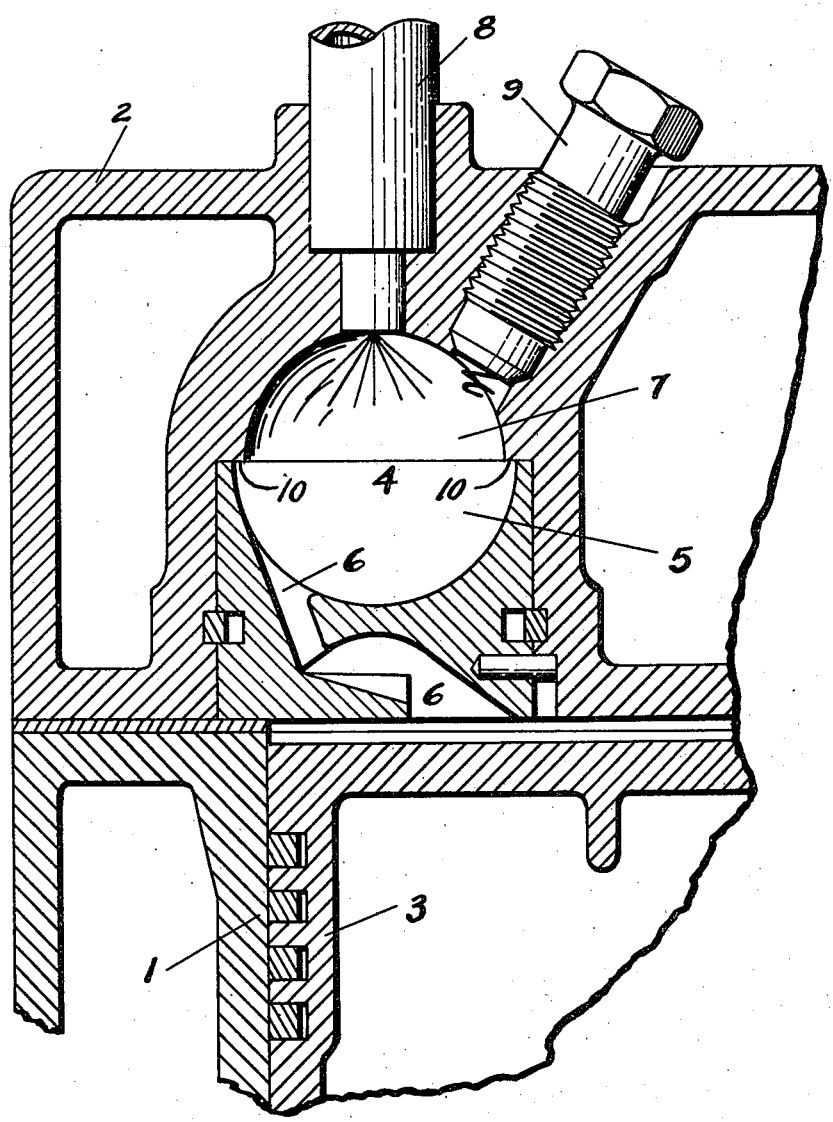
INVENTOR
James I. Kibbe
BY
Charles W. Dake
ATTORNEY Patented Oct. 29, 1935

2,018,727

UNITED STATES PATENT OFFICE 2,018,727

INTERNAL COMBUSTION ENGINE

James I. Kibbe, Muskegon, Mich., assignor to Campbell, Wyant & Cannon Foundry Company, Muskegon Heights, Mich., a corporation of Michigan Application June 18, 1934, Serial No. 731,064

3 Claims. (Cl. 123—32)

This invention pertains to internal combustion engines of the Diesel type wherein a precombustion chamber is employed, the invention pertaining particularly to combustion chambers for such engines. The principal object and purpose of the present invention is to provide a combustion chamber whereby a more perfect combustion of a combustible charge of air and oil compressed and within the combustion chamber will be had.

The invention is concerned with novel features of construction that will be readily understood from the following description taken in connection with the accompanying drawing, in which, The drawing is a cross-sectional view illustrating the invention as applied in the cover of an internal combustion engine.

Like reference characters refer to like elements throughout the drawing.

The engine, which may be of either multiple or single cylinder type, has a cylinder 1 and a cover 2 for the cylinder with a piston mounted for reciprocal movement within the cylinder; a combustion chamber 4 comprising a lower preferably semispherical shaped cavity 5 connected by a passage 6 to the cylinder cavity and an upper, also preferably semispherical shaped, cavity 7, which is of lesser radius than the lower cavity 5; the upper cavity 7 being provided with a fuel injection nozzle 8 and ignition plug 9. The cavities 5 and 7 being of different radii, a shoulder 10 is formed at the juncture of the two cavities.

In the operation of the engine, a charge of air is introduced and compressed within the cylinder and combustion chamber by the upward movement of the piston and when highly compressed as is necessary in Diesel engines, by the piston having reached its extreme limit of upward movement towards the cover, fuel oil is injected from the injection nozzle into the highly compressed air charge in the combustion chamber and by reason of the high degree of compression and the intermingling of the fuel oil and air, combustion takes place. The air in the combustion chamber being under a high degree of pressure, the fuel oil scatters as it is ejected from the nozzle and wipes or flows along the side of the upper section of the combustion chamber until it reaches the shoulder 10 between the cavities 5 and 7 where it leaves contact with the wall of the combustion chamber and mixes with the air in the combustion chamber cavity 5, thus producing a more perfect mixture of air and fuel during the period of combustion than has been possible heretofore.

While the combustion chamber is described and illustrated as comprising two semi-circular cavities of different radii, it is to be understood that they may be of several forms such as rectangular, elliptical or any form wherein the upper cavity provided with the injection nozzle is of smaller cross-sectional dimension than the lower cavity provided with the passage leading to the cylinder cavity without departing from the invention, which is defined in the appended claims and is to be considered comprehensive of all forms of structure coming within the scope thereof.

I claim:

1. In an internal combustion engine having a cylinder and a cover for the cylinder, a combustion chamber consisting of two hemispherical sections of different radii positioned with their open sides together, the larger section provided with a passage leading to the engine cylinder and the smaller having a fuel injection nozzle at the side farthest from the larger section.

2. In an internal combustion engine having a cylinder and a cover therefore, a combustion chamber consisting of two hemispherical concave sections of two different radii positioned with their open sides together to form an annular shoulder at the juncture of the two sections, the larger of said sections having a passage leading to the engine cylinder, and means for injecting fluid fuel into the smaller section at the side farthest removed from the shoulder at the juncture of the two sections.

3. In an internal combustion engine having a cylinder and a cover therefor, a combustion chamber comprising two hemispherical sectional cavities of different radii placed with their open sides adjacent each other to form an annular shoulder at the juncture of the two sections.

JAMES I. KIBBE.